UNITED STATES PATENT OFFICE.

GEORGE K. OSBORN, OF BROOKLYN, NEW YORK, ASSIGNOR, BY MESNE ASSIGNMENTS, TO CHARLES F. A. HINRICHS, OF SAME PLACE.

IMPROVEMENT IN LAMP-WICKS.

Specification forming part of Letters Patent No. 179,049, dated June 20, 1876; application filed March 17, 1876.

*To all whom it may concern:*

Be it known that I, GEORGE K. OSBORN, of the city of Brooklyn, Kings county, and State of New York, have invented an Improved Lamp-Wick; and I hereby declare the following to be a full, clear, and exact description thereof.

The object of my invention is to provide a lamp-wick, which, after having been once properly trimmed, will require no further trimming, but will last for an indefinite length of time; and which will afford a very superior light, without care or attention being required in its management.

My said invention consists in a molded lamp-wick, formed from a mineral composition of plaster-of-paris and asbestus, or similar mineral substances, with sugar or a carbonaceous substance, treated substantially as hereinafter set forth, so that it shall possess the requisite degree of porosity and shall be non-combustible and indestructible, or nearly so, by the effects of heat. For this purpose I make a compound of plaster-of-paris, with a refractory mineral substance, such as asbestus finely disintegrated, but with the fibers preserved in as long pieces as practicable, or pulverized pumice-stone, or similar substances, together with a suitable quantity of sugar, starch, or other carbonaceous substance. These materials I mix together in water, to the consistency of common paint, and place the compound in a mold, which may be of any suitable form to produce a wick of the shape required, whether tubular or flat. When the plaster-of-paris has set sufficiently to admit of the wick being handled without indenting its surface or changing its form, the latter is removed from the mold and placed in a suitable vessel, in which it is surrounded by pulverized charcoal, and subjected to a sufficient degree of heat to expel the oxygen and hydrogen from the sugar or other carbonaceous substance contained in the compound. By this means a rigid wick is formed, possessing great hardness and strength, together with a sufficient degree of porosity, and indestructible by fire, or nearly so; and which requires no trimming, and is adapted for burning kerosene and other oils under the best conditions to produce a brilliant, steady, white light.

In carrying out my invention I have found a compound of one part asbestus, six parts plaster-of-paris, and two parts sugar, to produce the best effects; but I have not found it necessary to, nor do I, confine myself to the proportions here specified, nor to the specific materials or substances mentioned, as both may be changed without materially changing the principles of my invention, the object being to produce a wick possessing great hardness, together with a sufficient degree of porosity, and the property of resisting the action of fire. Pumice-stone and similar minerals may be substituted for the asbestus, and lime or clay for the plaster-of-paris. And in like manner various saccharine and carbonaceous substances may be used in lieu of the sugar, care being taken to have the ingredients thoroughly mixed before being molded, so as to secure uniformity of texture in the finished article, combined with the requisite degree of porosity. The carbon is used as a cement, and being thoroughly diffused through the mass, after the heat has been applied, the whole is thereby reduced to a porous mass of uniform texture.

What I claim as my invention is—

A rigid molded lamp-wick, formed from a composition of plaster-of-paris, asbestus, and sugar, in about the proportions specified, and treated substantially in the manner set forth.

GEO. K. OSBORN.

Witnesses:
JOHN S. THORNTON,
GEO. W. THOMPSON.